United States Patent [19]
Licciardello et al.

[11] Patent Number: 4,903,942
[45] Date of Patent: Feb. 27, 1990

[54] COUPLING DEVICE WITH RETAINED ACTUATING MEMBERS

[75] Inventors: Maria Licciardello, Pordenone; Alladino Borghese, Montereale Vallcelina, both of Italy

[73] Assignee: Uniflex Utiltime S.p.A., Pordenone, Italy

[21] Appl. No.: 346,936

[22] Filed: May 3, 1989

[30] Foreign Application Priority Data

May 4, 1988 [IT] Italy .............................. 45723 A/88

[51] Int. Cl.⁴ .......................................... F16L 37/28
[52] U.S. Cl. ................................ 251/149.1; 285/315; 285/319; 285/331
[58] Field of Search ..................... 285/315, , 316, 319, 285/320, 331; 251/149.1

[56] References Cited

U.S. PATENT DOCUMENTS

| | | | |
|---|---|---|---|
| 1,699,591 | 1/1929 | Jennings | 285/246 |
| 3,468,562 | 9/1969 | Chow et al. | 285/423 |
| 3,847,393 | 11/1974 | Busselmeier | 285/321 |
| 3,873,062 | 3/1975 | Johnson et al. | 285/317 |
| 3,918,679 | 11/1975 | Silvana | 251/149.1 |
| 4,219,222 | 8/1980 | Brusadin | 285/315 |
| 4,429,906 | 2/1984 | Spadotto et al. | 285/315 |
| 4,660,803 | 4/1987 | Johnston et al. | 251/149.1 |
| 4,681,350 | 7/1987 | Gaita | 285/315 |
| 4,796,856 | 1/1989 | Munini | 285/315 |

FOREIGN PATENT DOCUMENTS 219705 4/1987 European Pat. Off. .

*Primary Examiner*—A. Michael Chambers
*Attorney, Agent, or Firm*—Wenderoth, Lind & Ponack

[57] ABSTRACT

A quick-release plug-in coupling device includes a female member to be connected to one hose and including a body, a valve seat internally of the body, and at least one opening through the body. A male member to be connected to another hose includes a body sealingly fittable into the body of the female member, the male member body having formed therein at least one recess. A valve member is positioned within the female member for movement between closed and opened positions relative to the valve seat. At least one actuating member is positioned outwardly of the female member and has an integrally formed elastic member extending inwardly through the opening in the body of the female member. The elastic member has an inner end fittable into the recess in the body of the male member. The actuating member is selectively manually movable axially of the female member between locking and release positions. The actuating member is constructed to prevent the actuating member from being separated from the female member when the actuating member is in the release position and also for preventing unintentional axial displacement of the actuating member relative to the female member when the actuating member is in the locking position.

16 Claims, 3 Drawing Sheets

FIG. 5
FIG. 6
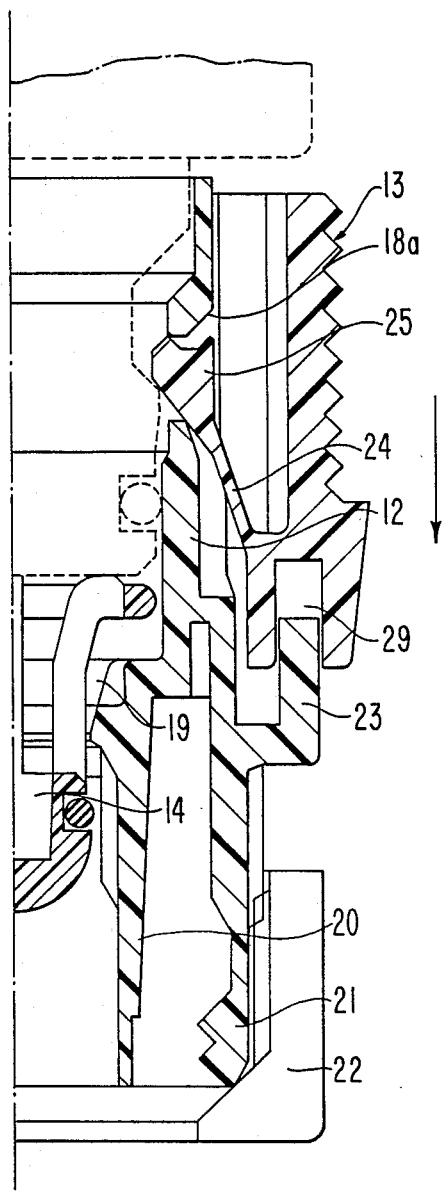
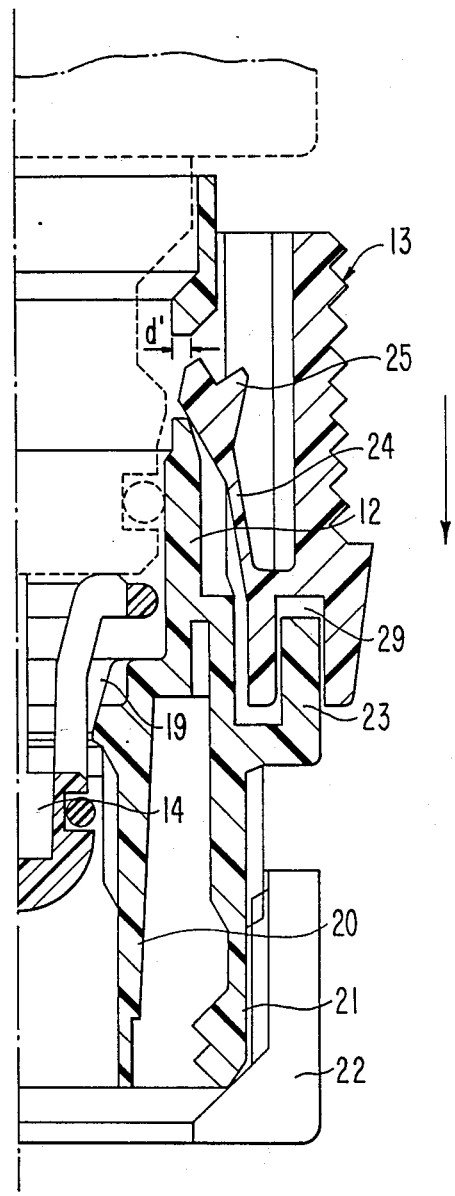

COUPLING DEVICE WITH RETAINED ACTUATING MEMBERS

BACKGROUND OF THE INVENTION

The present invention relates to a quick-release plug-in coupling device for the breakaway connection of hoses and other fluid carrying conduits, particularly flexible hoses for watering and irrigating equipment.

Coupling devices of this general type have been in existence for a substantial length of time and generally are formed to include a male member connectable to a first hose portion and capable of being plugged into a correspondingly shaped female member connected to a second hose portion, the connection or attachment between the male and female members being achieved by an actuating member provided internally with elastic means extending through suitable openings in the body of the female member and engaging in suitable slots in the body of the male member.

Also known are coupling devices wherein a valve is located inside the female member for stopping the flow of fluid, such valve being activated when the coupling device is released, i.e. when the male member is withdrawn from the female member, to prevent further fluid flow through and from the disconnected device. Coupling devices of this type currently are formed of a variety of plastic materials, depending upon the particular application involved.

One known coupling device is disclosed in U.S. Pat. No. 4,219,222 wherein an actuating member of a quick-release coupling device is in the form of an axially sliding ring nut inside which are integrally molded plastic members used to achieve engagement between the male and female members. This known device however has the disadvantage that a double operation is required to release the coupling, i.e. the male member must be pushed against the female member while the ring nut is moved in a release direction. Furthermore, this known device is not entirely reliable, since the elastic members can get stuck during actuation and, as a result, breakaway from the actuating member. Also, this known device does not include a fluid sealing valve.

Another known arrangement is disclosed in U.S. Pat. No. 4,429,906, wherein a female member is provided with locking pawls that are pressed by elastic pushing means formed integrally as a single piece of flexible material. A coupling connection is achieved by directly plugging a male member into the female member, while an axially sliding ring nut is provided exteriorly of the coupling for releasing the connection. In this arrangement the advantage of improved convenience of use is offset by the disadvantage of the need for an additional elastic member which is difficult to mold. Also, this known device has reduced reliability due to the required high degree of accuracy during assembly and also due to the free moving elastic member inside the coupling device.

U.S. Pat. No. 4,660,803 discloses a further type of quick-release coupling device wherein a ring nut provided for actuating release of the device is formed internally with a number of elastic fingers intended to ensure engagement of a male member with a female member, as well as a number of lugs designed to lock the female member. A fluid sealing valve is located within the body of the female member and is locked in place between an annular projection provided interiorly of the female member and a tang mounted on an end part of a fluid feeding hose. This arrangement however still is quite complex due to the requirements of molding of the internal configuration of the actuating ring nut. Also, the tang provided on the end part of the fluid feeding hose is an additional element requiring assembly and that will not ensure a satisfactory fluid seal unless it is fused in position, which operation would require an additional manufacturing operation.

European Patent Application No. 02 19 705 discloses a fluid sealing breakaway coupling device wherein plug-in and locking members are integrally molded as a single piece with the body of a female member. This arrangement however substantially complicates the construction of the entire female member which thus must be formed of high quality expensive plastic material, for example acetal resins. Also, this arrangement still requires an external ring nut for actuating of the coupling.

Additionally, all such known types of coupling devices generally speaking have the disadvantage of possibly becoming released unintentionally or accidentally. Thus, this type of coupling device frequently is dragged along the ground where it can meet with obstacles of various types, such as stones, roots, edges of pavement, floors and flower beds, etc. Contact of the actuating member with such obstacle can result in unintentional release of the coupling.

Furthermore, all of these types of known coupling devices must be provided with suitable retaining means for ensuring that the actuating ring nut is retained on the device to prevent it from slipping off when coupling is released, as well as from displacing axially when the coupling is plugged-in. Normally, these retaining means are directly molded or otherwise provided in the body of the ring nut itself and are formed by suitable teeth engaging into corresponding catch slots in the body of the female member (such as described in the above discussed U.S. Pat. No. 4,660,803). This clearly requires that the molding operation of both the ring nut and the female member be substantially complicated.

SUMMARY OF THE INVENTION

With the above discussion in mind, it is the primary object of the present invention to provide a quick-release plug-in coupling device for the breakaway connection of hoses whereby it is possible to overcome the above and other prior art disadvantages.

It is a more specific object of the present invention to provide such a coupling device that is easier to manufacture and more reliable than known coupling devices.

It is an even further object of the present invention to provide such a coupling device of a construction that eliminates the inconvenience of the device being accidentally or unintentionally released during use.

The above objects are achieved in accordance with the present invention by the provision of a quick-release plug-in coupling device for the breakaway connection of hoses, particularly hoses for the distribution of fluids, and including a female member to be connected to one hose and including a body, a valve seat internally of such body, and at least one opening through such body. A male member to be connected to another hose includes a body sealingly fittable within the body of the female member, the body of the male member having formed therein at least one recess. A valve member is positioned within the female member for movement between a closed position, whereat the valve member seals against the valve seat, and an open position, whereat the valve member is spaced from the valve seat. At least one actuating member is positioned outwardly of the female member and has an integrally formed elastic member extending inwardly through the opening in the body of the female member. The elastic member has an inner end fittable into the recess in the body in the male member. The actuating member is selectively manually movable axially of the female member between a locking position, whereat the inner end of the elastic member fits into the recess in the body of the male member to thereby retain the male member within the female member, and a release position, whereat the inner end of the elastic member is withdrawn from the recess to thereby enable the male member to be withdrawn from the female member. The actuating member includes means for preventing the actuating member from being separated from the female member when the actuating member is in the release position thereof and also for preventing unintentional axial displacement of the actuating member relative to the female member when the actuating member is in the locking position thereof.

Preferably, the coupling device includes plural, for example two, separate actuating members formed independently of each other, and each having an elastic member extending through a respective opening in the female member into a respective recess in the male member.

In accordance with a preferred embodiment of the present invention, the preventing means comprises a recess formed in the free end of the elastic member, such recess abutting and receiving an edge of the opening in the body of the female member. The elastic member extends from the actuating member in a downstream direction with respect to fluid flow through the device, and the edge of the opening that is received in the recess in the free end of the elastic member is a downstream edge of the opening. The recess in the free end of the elastic member is defined between outer and inner ridges formed on such free end. The outer ridge is tapered and abuts a complementary tapered outer surface of the edge of the opening when the actuating member is in the locking position. The inner ridge is triangular in transverse cross section and has a base width greater than the thickness of the border of the edge of the opening.

In accordance with a further preferred feature of the present invention, the female member has on the exterior thereof an axial guide member that is directed in the downstream direction, and the actuating member has axial guides directed in the upstream direction and in sliding engagement with the guide member. The axial guides are defined on opposite sides of a groove formed in the actuating member, and the guide member extends into such groove.

The above structural features of the present invention prevent the actuating member from falling away from or slipping off the female member when the actuating member is in the release position enabling the male member to be withdrawn from the female member. Such structural features also prevent the actuating member from unintentionally or accidentally displacing axially of the female member when the coupling device is in the engaged, coupled position.

BRIEF DESCRIPTION OF THE DRAWINGS

Other objects, features and advantages of the present invention will be apparent from the following detailed description of a preferred embodiment thereof, with reference to the accompanying drawings, wherein:

FIGS. 5 and 6 are partial longitudinal sectional views, similar to the right-hand portion of FIG. 1, but illustrating the coupling device in varying stages of achieving release of coupling.

DETAILED DESCRIPTION OF THE INVENTION

Figure 1:
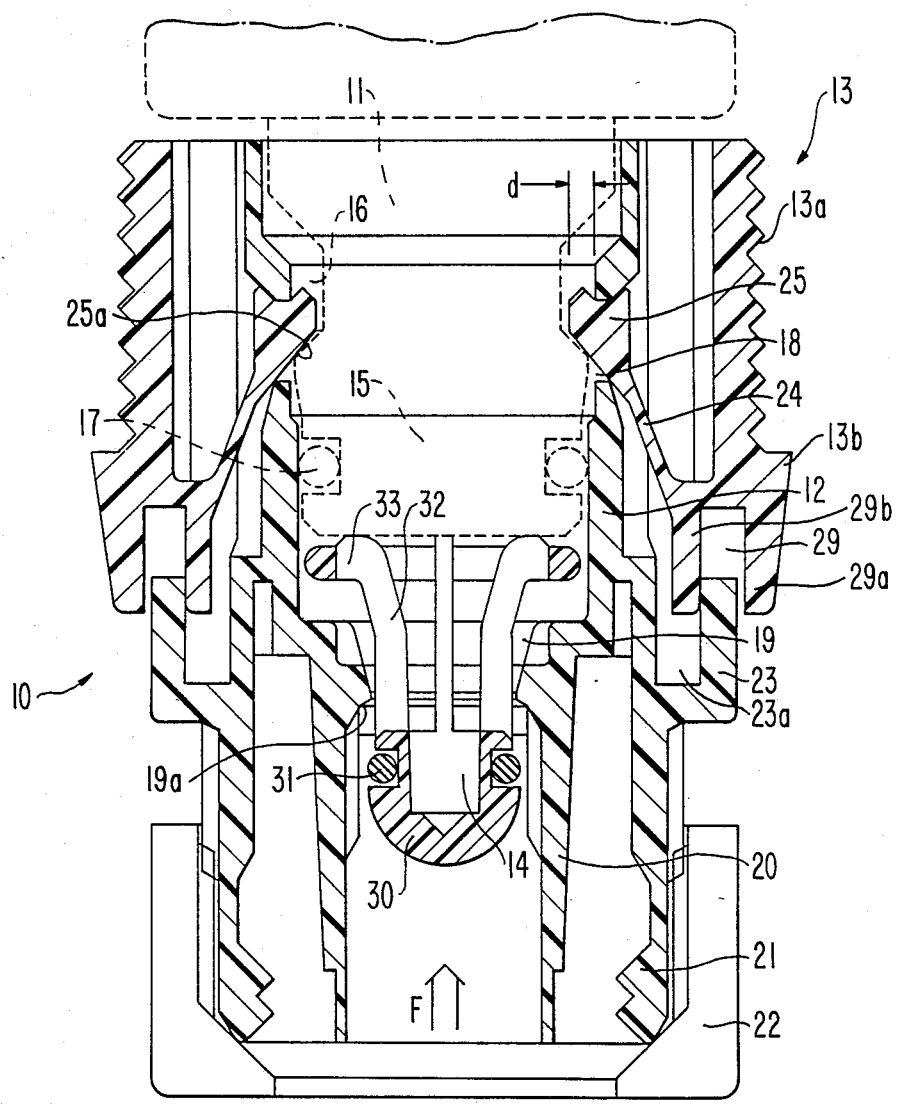
FIG. 1 is a longitudinal cross-sectional view through a coupling device in accordance with the present invention.
Figure 2:
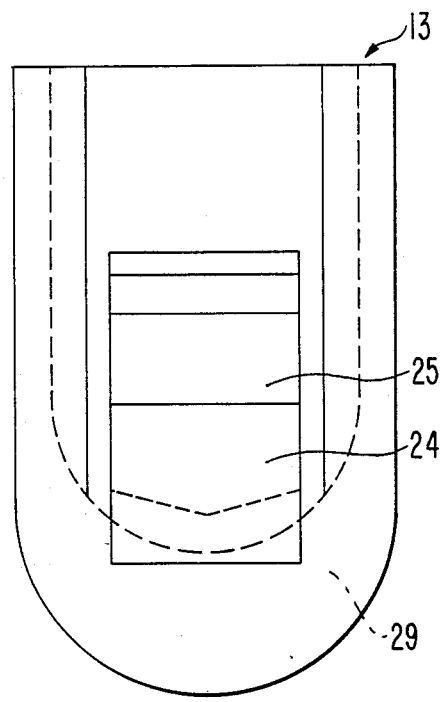
FIG. 2 is a front outer view of an actuating member of the coupling device.
Figure 3:
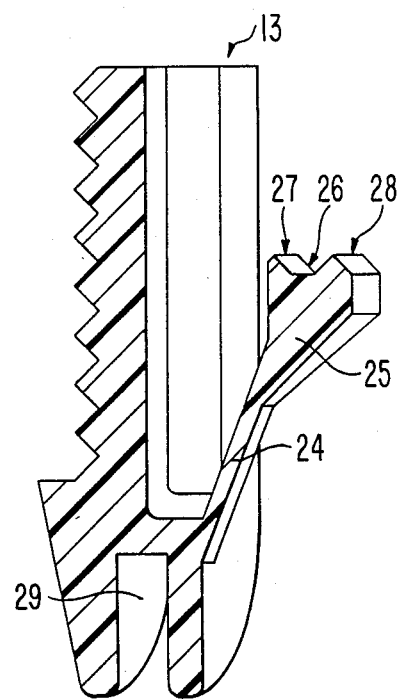
FIG. 3 is a longitudinal cross-sectional view through the actuating member.
Figure 4:
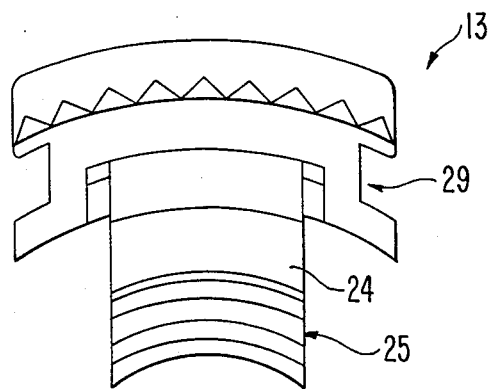
FIG. 4 is a plan view of the actuating member, as viewed from the top of FIG. 2.

As shown in the drawings a coupling device 10 according to the present invention includes a male member 11, a female member 12, at least one actuating member 13 (two actuating members 13 being shown in the illustrated embodiment), and a valve member 14. In FIG. 1 the coupling device is shown in the plug-in coupled condition. In FIG. 5 the coupling device is shown in an initial position of actuating of member 13 to uncouple the device, and in FIG. 6 the actuating member is shown in a fully released position that will enable the male member to be withdrawn from the female member.

The male member 11 is to be connected to one hose in a known manner and is provided with a plug-in inner end 15 having an outer diameter closely sized to ensure a tight fit with an inner surface of the body of the female member 12. Male member 11 is axially bored (not shown) to ensure passage of fluid through the coupled hoses. Recesses 16, for example grooves, are molded into the outer surface of the inner end 15 for a purpose to be described in more detail below. Recesses 16 could be defined by a single annular groove. End surfaces of recesses 16 are inclined as illustrated for a purpose that will be apparent from the following discussion. Inner end 15 also is provided in a known manner with a seal 17 of the O-ring type for ensuring a fluid-tight seal with the inner surface of the body of the female member.

Female member 12 includes a body provided internally with a projection 19 having an upstream surface 19a defining a valve seat. Openings 18 extend through the body of female member 12 for a purpose to be discussed below. The body of female member 12 is extended to include an internal tubular portion 20 onto which an in-flowing fluid hose (not shown) is to be attached in a normal manner. The body of female member 12 further includes external jaws 21 onto which is threaded a ring nut 22. The in-flowing fluid hose thus is scarfed and clamped between the tubular portion 20 and the jaws 21 by tightening of the ring nut 22 in a normal manner.

Valve member 14 is housed within female member 12 and includes an integral single-piece construction including an ogive 30 having around the periphery thereof a seal 31 of the O-ring type. The ogive 30 faces in the upstream direction with respect to the direction of fluid flow, indicated by arrow F in FIG. 1. Seal 31 is abuttable with valve seat surface 19a to close off in a sealing manner the flow of fluid through the coupling device when the valve member 14 is in a closed position (not shown). Valve member 14 further includes a plurality of legs 32 projecting from ogive 31 and extending downstream beyond projection 19. The free ends of the legs 32 are connected by a ring 31 capable of abutting against the downstream end of projection 19. This rigid structure of the valve enables the valve member to be snapped into the female member from the downstream end thereof, thus providing a quick and easy assembly operation, improved tightness and a more effective sealing capability. It will be apparent that, with the seal 31 seating on valve seat 19a, i.e. with male member 11 withdrawn from female member 12, upon insertion of male member 11 into female member 12, the leading end of inner end 15 of the male member will abut the downstream end of legs 32, ring 31 of the valve member and lift the valve member in an upstream direction thereby spacing seal 31 from valve seat 19a and opening the valve, thereby enabling fluid flow through the coupling device between the two thus coupled hoses.

On the exterior of female member 12 are provided a plurality, for example two in the illustrated embodiment, of axial guide members 23 extending in the downstream direction and spaced from the outer surface of the female member by gaps 23a. Also, each actuating member 13 has a pair of axial guides 29a, 29b separated by an axial groove 29 and extending in the upstream direction. Each guide member 23 fits into the groove 29 of a respective actuating member 13, and the guides 29a, 29b slide axially along guide member 23.

Each actuating member 13 has extending inwardly and in a downstream direction therefrom an elastic member 24 formed integrally with actuating member 13. Elastic member 24 has an inner end portion 25 extending through a respective opening 18 in the body of female member 12 and fitting within a respective recess 16 formed in the body of male member 11 to thus lock or hold the male member within the female member. The enlarged end portion 25 of each elastic member 24 has therein a recess 26 defined between outer and inner ridges 27, 28. When the coupling device is in the coupled position shown in FIG. 1, the recess 26 receives the downstream edge defining the opening 18 in the body of the female member. The outer ridge 27 is tapered and abuts a complementary tapered outer surface 18a of opening 18 when the actuating member is in the locking position shown in FIG. 1. The inner ridge 28 is triangular in transverse cross-section and has a base width d (FIG. 1) greater than the thickness d' (FIG. 6) of a border of the downstream edge of opening 18. The upstream edge of the opening 18 is abutted by an inclined surface 25a of the end portion 25.

The above features regarding the profile and configuration of the end portion 25 effectively operate to prevent the actuating member from being separated from the female member 12 when the actuating member is in the release position (FIG. 6). Thus, the elastic capabilities of the elastic member 24, combined with the guiding relationship between guide member 23 and guides 29a, 29b, as well as the ridges 27, 28 prevent the actuating member 13 from falling off or sliding off the female member. This is achieved even though the two actuating members 13 are individually formed and are not connected. Additionally, the above structural features act as means for preventing the unintentional axial displacement of the actuating member relative to the female member when the actuating member is in the locking position (FIG. 1). As a consequence, it is not necessary to provide any additional structure for maintaining the actuating member 13 in place about the female member, contrary to known devices that require such structure generally in the form of teeth and projections molded directly on the actuating member and female member, respectively. Accordingly, the construction of the present invention is less complex and more reliable.

The two actuating members 13 are provided, in the illustrated preferred arrangement, at diametrically opposed locations. It is to be understood however that the present invention could include differently oriented or a different number of actuating members than illustrated. On the outer portion of each actuating member 13 is provided a knurled outer surface 13a and an enlarged border portion at the upstream end for improved convenience in handling and actuating the coupling device. The groove 29 in each actuating member 13 is continuous and extends along opposite axial sides of the actuating member as well as along the upstream facing end thereof. Groove 29 enables the actuating member 13 to be axially displaced relative to guide member 23, in the manner discussed above.

As will be apparent from the above discussion, if a pair of hoses connected by the coupling device of the present invention is dragged along the ground where it might strike against various obstacles, even if one of the actuating members 13 strikes against such obstacle and is caused to be released, the opposite actuating member 13 very probably would not strike against such obstacle and therefore would maintain the coupling device firmly coupled together.

The above discussed arrangement provides two separate and totally independent actuating members 13. It is to be understood however that it is intended to be within the scope of the present invention that the two actuating members 13 in fact could be connected together in the conventional manner, for example by means of a single ring nut, while providing the above discussed other advantages of the present invention.

Although the present invention has been described and illustrated with respect to preferred features thereof, it is to be understood that various changes and modifications may be made to the specifically described and illustrated features without departing from the scope of the present invention.

We claim:

1. A quick-release plug-in coupling device for the breakaway connection of hoses, particularly hoses for the distribution of fluids, said device comprising:
   a female member to be connected to one hose and including a body, a valve seat internally of said body, and at least one opening through said body;
   a male member to be connected to another hose and including a body sealingly fittable into said body of said female member, said male member body having formed therein at least one recess;
   a valve member positioned within said female member for movement between a closed position, whereat said valve member seals against said valve seat, and an open position, whereat said valve member is spaced from said valve seat;
   at least one actuating member positioned outwardly of said female member and having an integrally formed elastic member extending inwardly through said opening in said body of said female member, said elastic member having an inner end fittable into said recess in said body of said male member, said actuating member being selectively manually movable axially of said female member between a locking position, whereat said inner end of said elastic member fits into said recess to thereby retain said male member within said female member, and a release position, whereat said inner end of said elastic member is withdrawn from said recess to thereby enable said male member to be withdrawn from said female member; and said actuating member including means for preventing said actuating member from being separated from said female member when said actuating member is in said release position and for preventing unintentional axial displacement of said actuating member relative to said female member when said actuating member is in said locking position.

2. A device as claimed in claim 1, wherein said preventing means comprises a recess formed in said free end of said elastic member, said recess abutting and receiving an edge of said opening in said body of said female member.

3. A device as claimed in claim 2, wherein said elastic member extends from said actuating member in a downstream direction with respect to fluid flow through said device, and said edge of said opening received in said recess in said free end of said elastic member comprises a downstream edge of said opening.

4. A device as claimed in claim 3, wherein said recess in said free end of said elastic member is defined between outer and inner ridges formed on said free end.

5. A device as claimed in claim 4, wherein said outer ridge is tapered and abuts a complementary tapered outer surface of said edge of said opening when said actuating member is in said locking position.

6. A device as claimed in claim 4, wherein said inner ridge is triangular in section and has a base width greater than the thickness of a border of said edge of said opening.

7. A device as claimed in claim 3, wherein said female member has on the exterior thereof an axial guide member, and said actuating member has axial guides in sliding engagement with said guide member.

8. A device as claimed in claim 7, wherein said guide member is directed in the downstream direction, and said guides are directed in the upstream direction.

9. A device as claimed in claim 7, wherein said axial guides are defined on opposite sides of a groove formed in said actuating member, and said guide member extends into said groove.

10. A device as claimed in claim 3, wherein said elastic member has an inclined surface opposite said recess and in sliding engagement with an upstream edge of said opening.

11. A device as claimed in claim 1, wherein said male member has at an inner end thereof a seal fluid-tightly sealing against an inner surface of said body of said female member.

12. A device as claimed in claim 1, wherein said valve seat is formed on an upstream end, with respect to the direction of fluid flow through said device, of a projection extending inwardly from said body of said female member, and said valve member is movable in a downstream direction from said open position to said closed position.

13. A device as claimed in claim 12, wherein said valve member includes extensions extending downstream beyond said projection, and downstream ends of said extensions include means capable of abutting a downstream end of said projection when said valve member is in said open position.

14. A device as claimed in claim 13, wherein said male member has an inner end abutting said extensions when said male member is inserted into said female member and moving said valve member from said closed position to said open position.

15. A device as claimed in claim 1, comprising plural said actuating members formed separately and operable independently.

16. A device as claimed in claim 1, comprising plural said actuating members joined externally of said female member by a common actuating ring.

* * * * *